(12) United States Patent
Temkin et al.

(10) Patent No.: US 7,174,776 B2
(45) Date of Patent: Feb. 13, 2007

(54) METHODOLOGY FOR VEHICLE BOX COMPONENT DURABILITY TEST DEVELOPMENT

(75) Inventors: Mikhail Temkin, Troy, MI (US);
James W Tindall, Oxford, MI (US);
David Santi, Shelby Township, MI (US); Lawrence Black, Utica, MI (US)

(73) Assignees: DaimlerChrysler Corporation, Auburn Hills, MI (US); Defiance Testing & Engineering Services, Inc., Troy, MI (US)

( * ) Notice: Subject to any disclaimer, the term of this patent is extended or adjusted under 35 U.S.C. 154(b) by 0 days.

(21) Appl. No.: 11/144,284

(22) Filed: Jun. 3, 2005

(65) Prior Publication Data

US 2006/0059993 A1   Mar. 23, 2006

Related U.S. Application Data

(60) Provisional application No. 60/611,990, filed on Sep. 22, 2004.

(51) Int. Cl.
*G01L 3/26* (2006.01)

(52) U.S. Cl. .................. 73/116; 73/12.01; 73/12.04
(58) Field of Classification Search .......... 73/116–120, 73/12.01–12.41
See application file for complete search history.

(56) References Cited

U.S. PATENT DOCUMENTS 4,908,767 A * 3/1990 Scholl et al. ............... 701/220
6,018,980 A * 2/2000 Kimura et al. ............ 73/12.04

* cited by examiner

*Primary Examiner*—Edward Lefkowitz
*Assistant Examiner*—Jermaine Jenkins
(74) *Attorney, Agent, or Firm*—Ralph E. Smith

(57) ABSTRACT

A vehicle component test method includes measuring first acceleration data at discrete locations on a first vehicle frame during an actual road test of a first vehicle and measuring second acceleration data at the discrete locations on a second vehicle frame of a second vehicle mounted on a test fixture. The second acceleration data is compared to the first acceleration data and an acceleration error is generated. The test fixture is adjusted based on the acceleration error until the acceleration error is within a predetermined range.

20 Claims, 9 Drawing Sheets

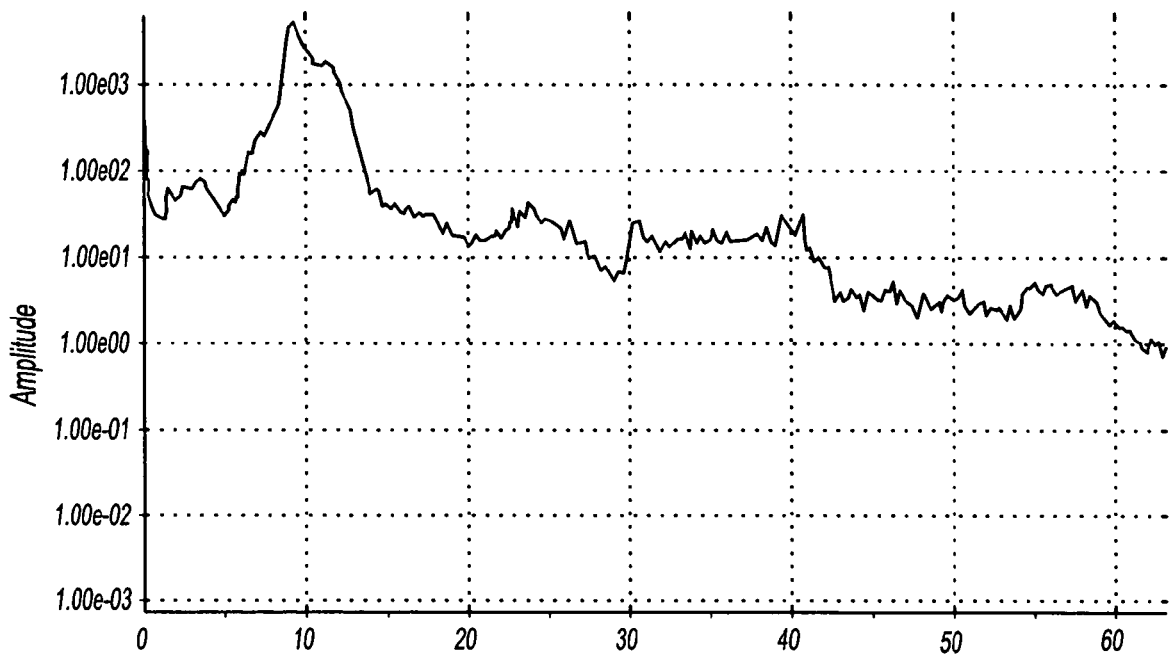
Fig-7 Frequency (0.0, 63.3) Hz
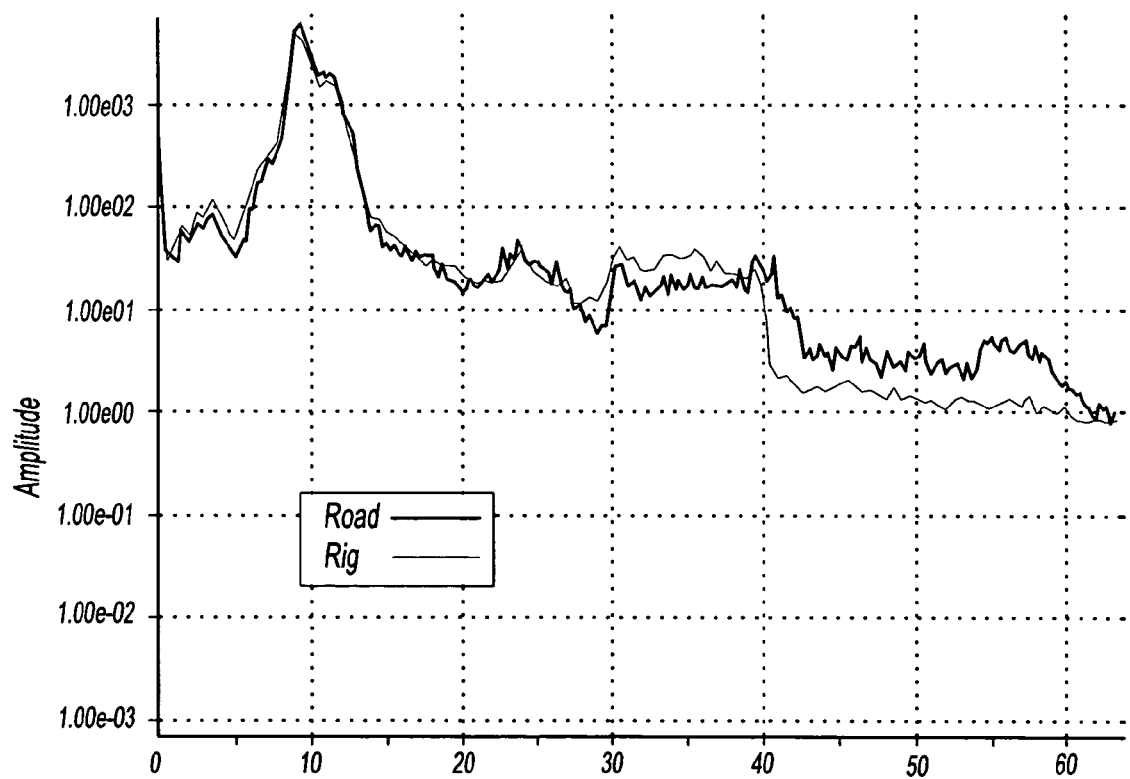
Frequency (0.0, 63.3) Hz Fig-9

METHODOLOGY FOR VEHICLE BOX COMPONENT DURABILITY TEST DEVELOPMENT

CROSS-REFERENCE TO RELATED APPLICATIONS

This application claims the benefit of U.S. Provisional Application No. 60/611,990, filed on Sep. 22, 2004. The disclosure of the above application is incorporated herein by reference.

FIELD OF THE INVENTION

The invention relates to vehicle test methods and more particularly to a component test for a truck box or truck cab that can be performed without suspension parts.

BACKGROUND OF THE INVENTION

During vehicle development, full-vehicle tests are typically performed on prospective vehicles to ensure drivability and durability. Such tests are usually performed using a prototype, fully-assembled, vehicle on various test roads of varying surfaces (i.e., cobblestone, dirt, gravel, etc.).

Full-vehicle tests are generally expensive due to high assembly and component costs associated with testing a prototype vehicle. Therefore, individual vehicle components that require testing on a fully-assembled prototype vehicle require a manufacturer to spend more money than would be necessary if the same component could be tested on a separate test fixture. For example, truck boxes and truck cabs can typically only be tested for durability if a vehicle is cycled through either a full-vehicle test on actual test roads or in a laboratory on a full-vehicle test fixture. In this manner, when design changes are made to a truck box or truck cab, full-vehicle tests, complete with suspension components, are often required to properly validate the new design. As such, manufacturers incur high costs in validating individual vehicle components when full-vehicle tests are required.

SUMMARY OF THE INVENTION

A vehicle component test method includes measuring first acceleration data at discrete locations on a first vehicle frame during an actual road test of a first vehicle and measuring second acceleration data at the discrete locations on a second vehicle frame of a second vehicle mounted on a test fixture. The second acceleration data is compared to the first acceleration data and an acceleration error is generated. The test fixture is adjusted based on the acceleration error until the acceleration error is within a predetermined range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will become more fully understood from a reading of a detailed description, taken in conjunction with the accompanying drawings, wherein:

FIG. 7 is an exemplary plot of box strain obtained during a road test;

FIG. 9 is an exemplary plot comparing box strain as measured during an actual road test versus a box strain as measured using the testing method of the invention;

DETAILED DESCRIPTION

The following description is merely exemplary in nature and is in no way intended to limit the teachings, application, or uses of the invention.

With reference to the drawings, a component test method for use with a full-vehicle test fixture 10 is provided. The full-vehicle test fixture 10 is preferably a MTS 329 or MTS 329LT full-vehicle test fixture, offered by MTS Systems Corporation of Eden Prairie, Minn. The test fixtures 10 are designed to exercise a total vehicle system 12 (i.e., body, frame, and suspension) and are capable of applying up/down, fore/aft, and cross-car forces to the vehicle 12. The forces applied to the vehicle 12 are intended to mimic actual road data collected on a test road to re-create the road test in a laboratory setting.

Figure 1:
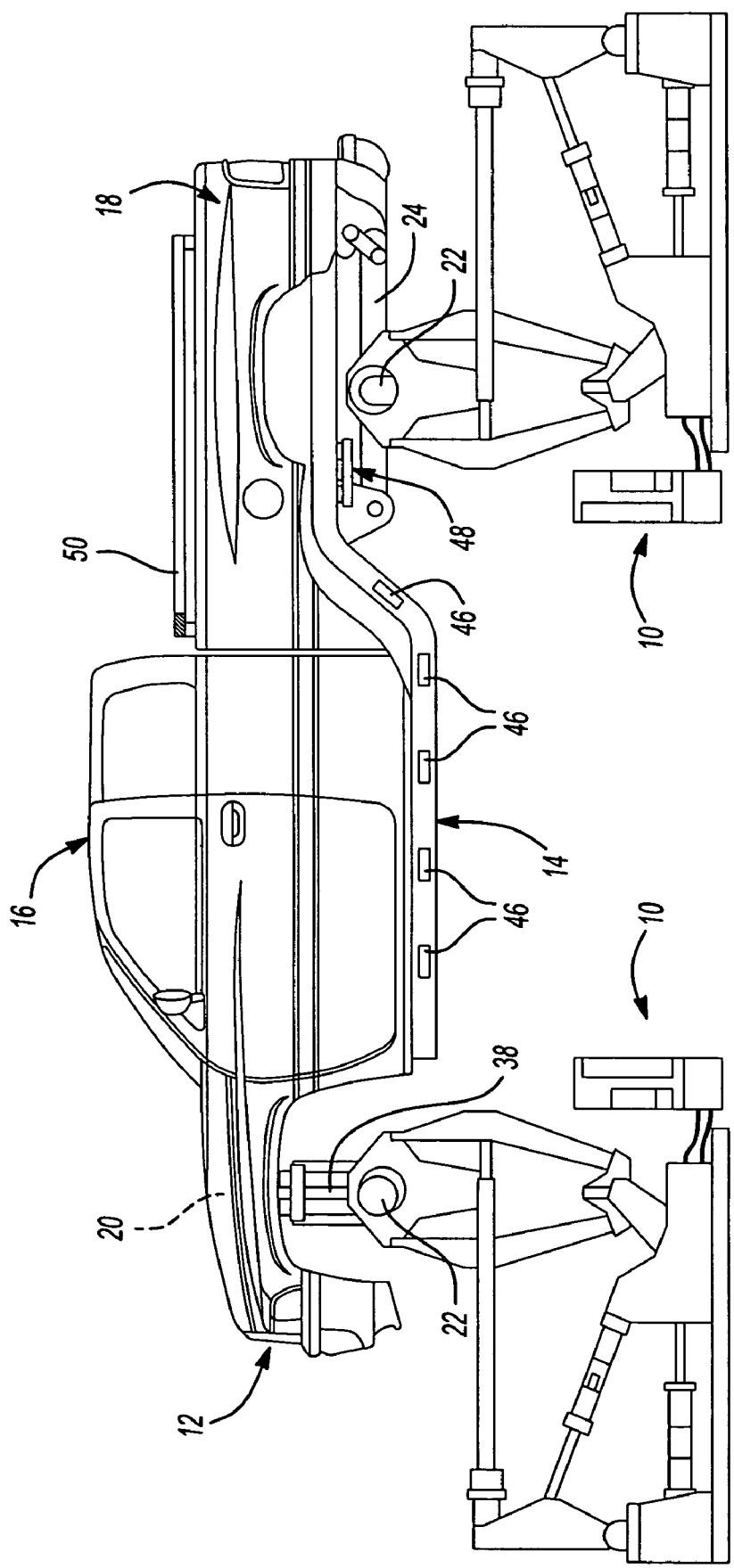
FIG. 1 is a side view of a test vehicle on a full-vehicle test fixture.

The exemplary vehicle 12 shown in FIG. 1 includes a frame 14, a truck cab 16, a truck box 18, and an engine 20. The vehicle 12 is installed onto one of the MTS fixtures 10 generally at each spindle 22. A suspension system (not shown) of the vehicle 12 is removed prior to testing to allow simulated road tests to be performed in the laboratory setting independent of the suspension system. The present teachings provides an accurate simulation of an actual road test performed with a vehicle suspension assembled to the vehicle 12 without requiring such suspension system during laboratory testing.

The vehicle system is configured as a full-truck inertial-reacted system while the MTS fixture 10 is configured to run in standard matrix control modes. Rear leaf springs (not shown) are removed from the vehicle 12 and replaced with tubing 24. Existing spring shackles 26 incorporating rubber grommets 28 fixedly attach the tubing 24 to the frame 14 while existing u-bolts 30 fixedly attach a rear axle 32 of the vehicle system 12 to the tubing 24.

Figure 2:
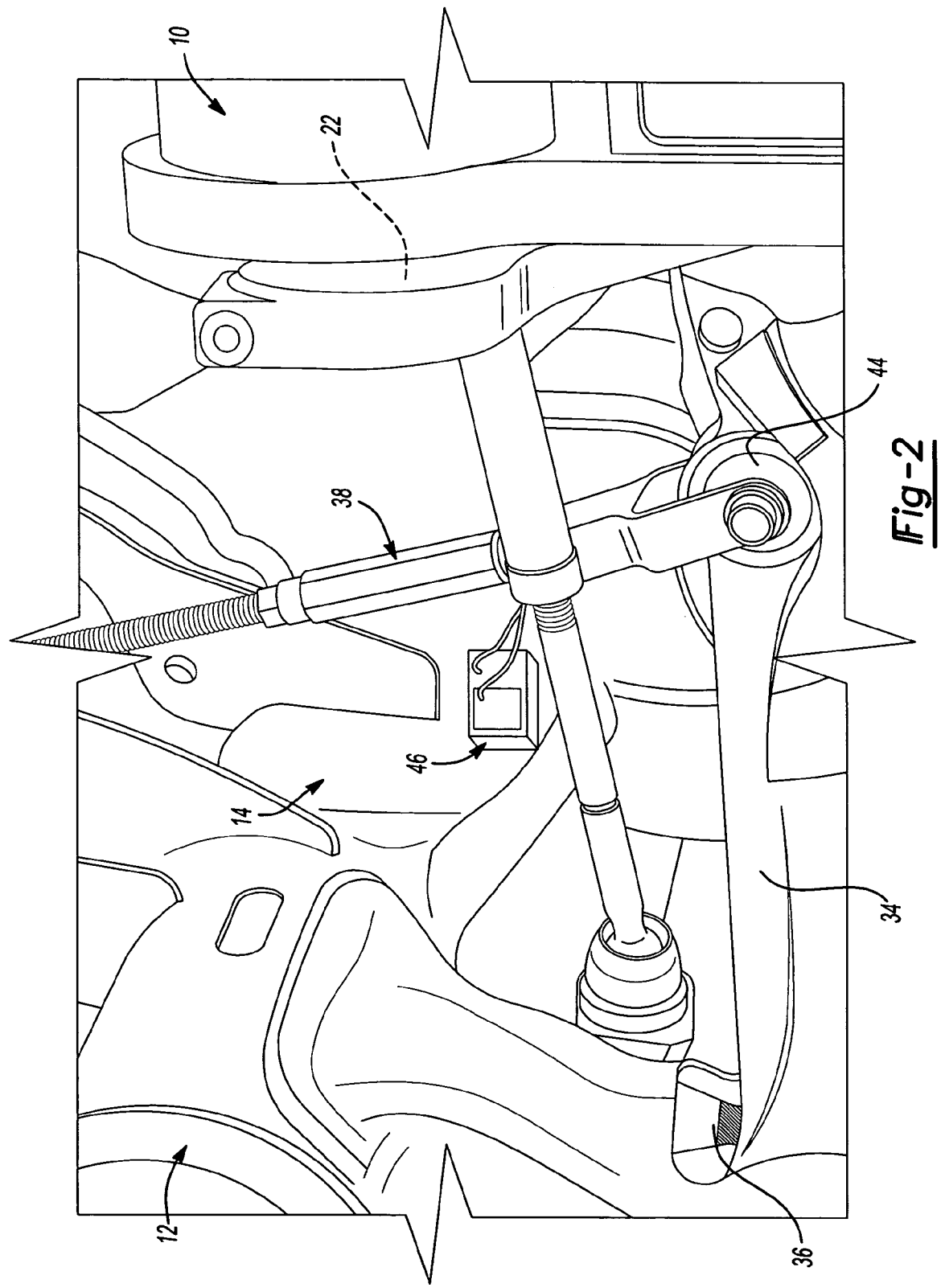
FIG. 2 is a perspective view of a front fixture mount of the test vehicle of FIG. 1.

Coil springs (not shown) are removed from the suspension system of the vehicle 12 to allow front lower control arms 34 to be fixedly attached to the vehicle 12. A turnbuckle fixture 38 (FIGS. 1 and 2) is used to maintain a position of the lower control arms 34 relative to the frame 14. Attachment points between the turnbuckle fixture 38 and the lower control arms 34 utilize rubber grommets 44 to help reduce vibration during testing and to better simulate an actual suspension system.

Figure 3:
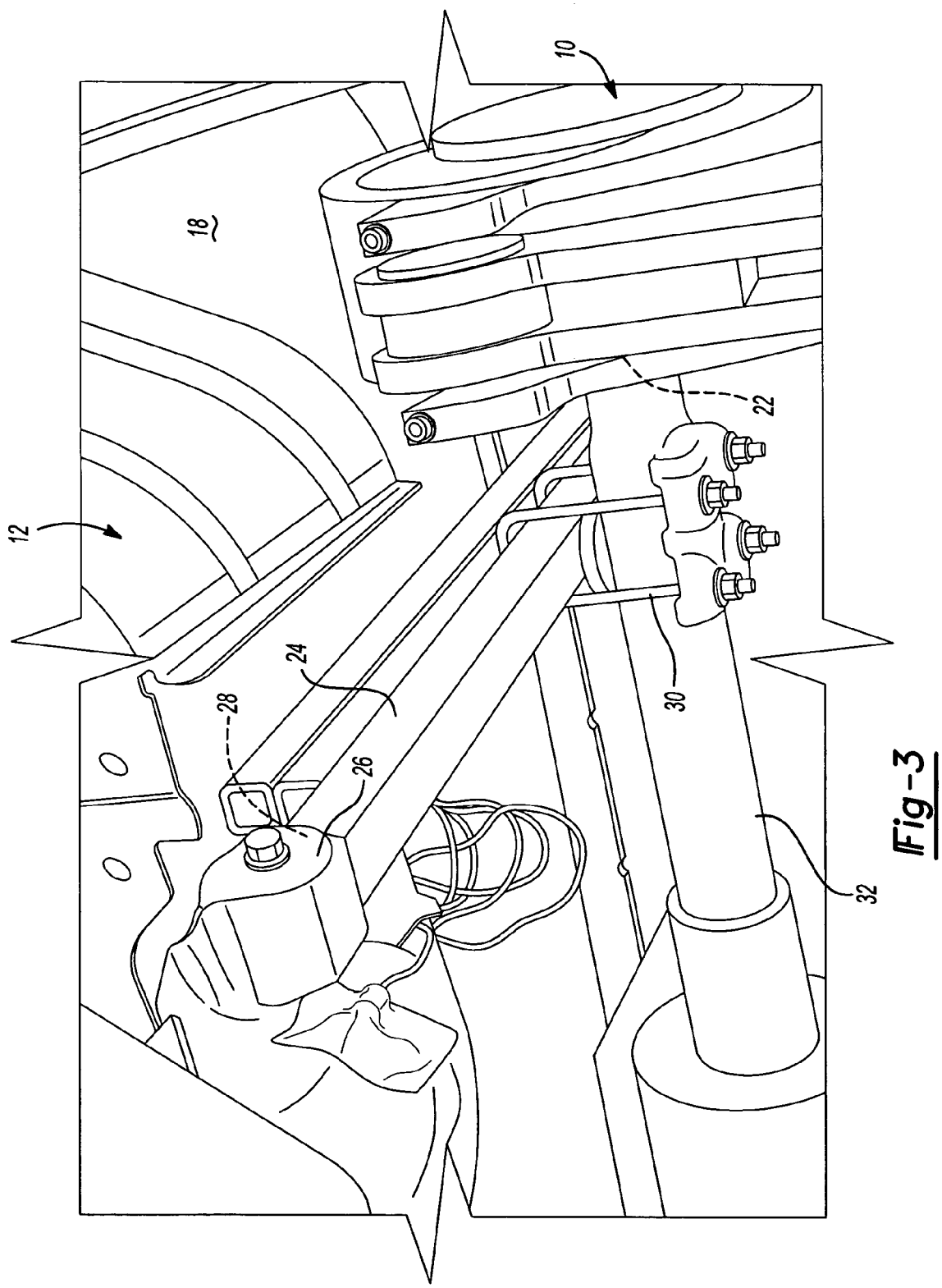
FIG. 3 is a perspective view of a rear fixture mount of the test vehicle of FIG. 1.

Acceleration, twist, and strain frame data are collected during testing through use of vertical, longitudinal and lateral accelerometers 46 installed at select locations of the vehicle 12 and vehicle frame 14. Furthermore, frame twist transducers 48 and a box twist transducer 50 (FIG. 3) are installed on the box 18. The position of the accelerometers 46 on the vehicle 12 and frame 14 during testing on the fixture 10 is determined by the position of the accelerometers 46 during actual road tests.

Positioning the accelerometers in such a fashion helps to simulate the actual road test in the laboratory setting. Once the accelerometers are properly installed, acquired data from the laboratory is analyzed for damage contribution with test road segments selected in a fashion that preserve ninety percent or more of the test severity.

Figure 4:
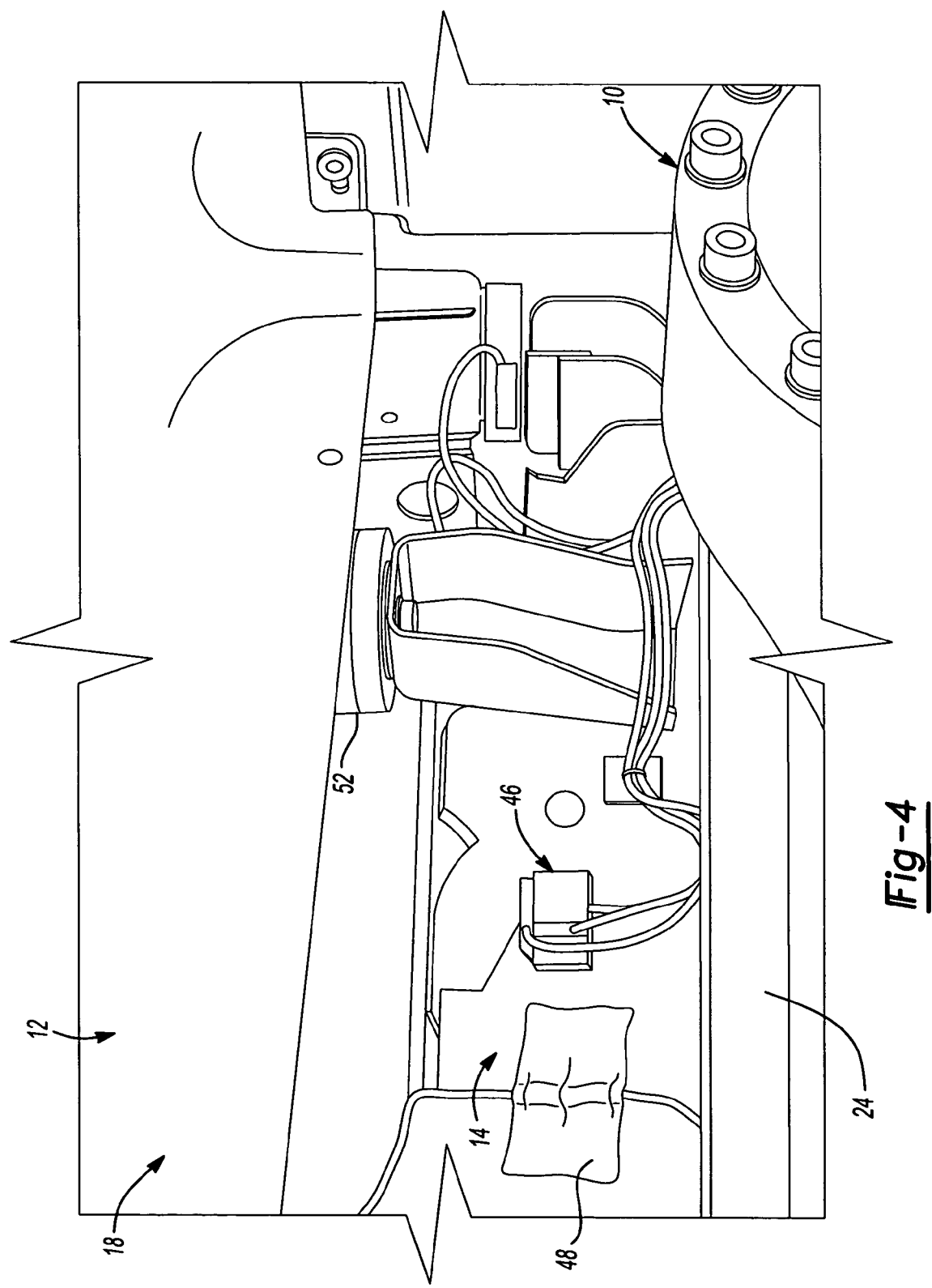
FIG. 4 is a perspective view of the rear fixture mount of FIG. 3 showing an accelerometer and a load cell.

For example, in one configuration, twenty accelerometers 46 are placed in various locations of the truck frame 14. The accelerometers 46 are positioned at specific locations on the vehicle frame 14 that correspond to positions used during actual road tests with tri-axial transducers used at each of the four spindle locations 22. In addition, box and frame twist transducers 48, 50 are installed on the box 18 and frame 14, respectively, using Finite element analysis (FEA) modeling to identify optimum sensor location. Box-mount triaxial load cells 52 may also be installed at each mounting location interface to determine vertical, lateral, and longitudinal loads generally between the box 18 and the frame 14 (FIG. 4).

Figure 5:
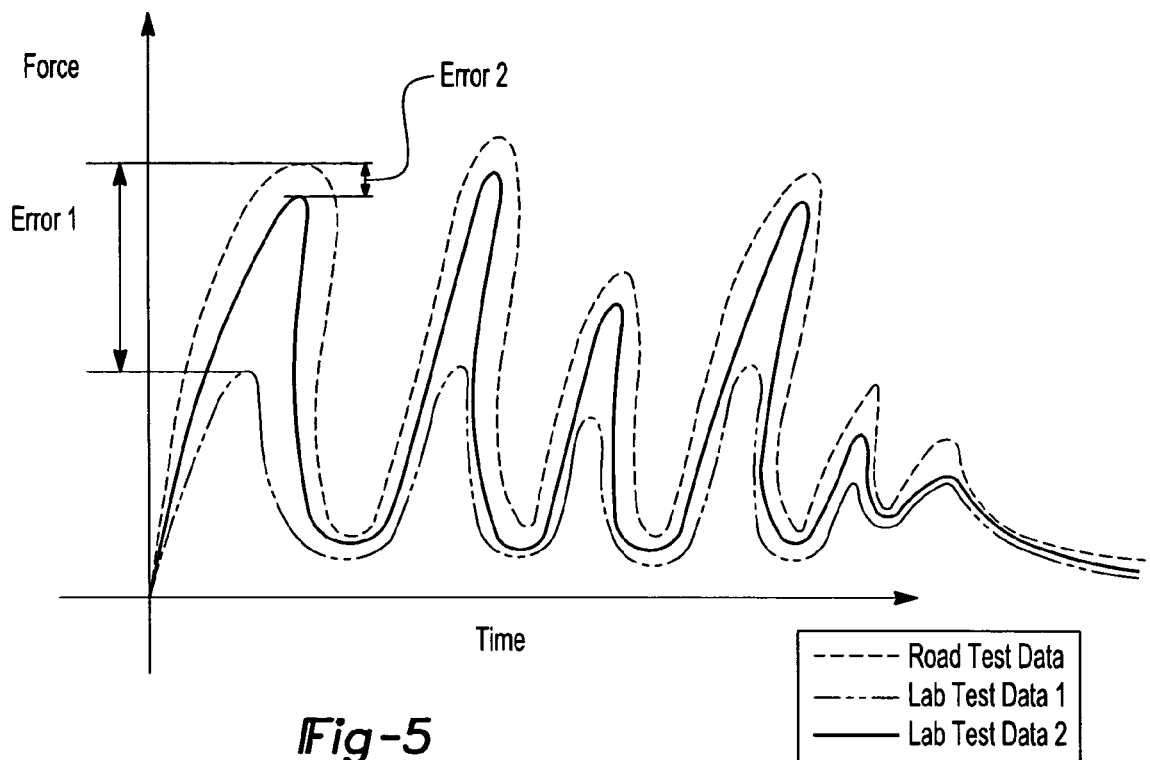
FIG. 5 is an exemplary plot showing an iterative testing process in accordance with the testing method of the invention.
Figure 6:
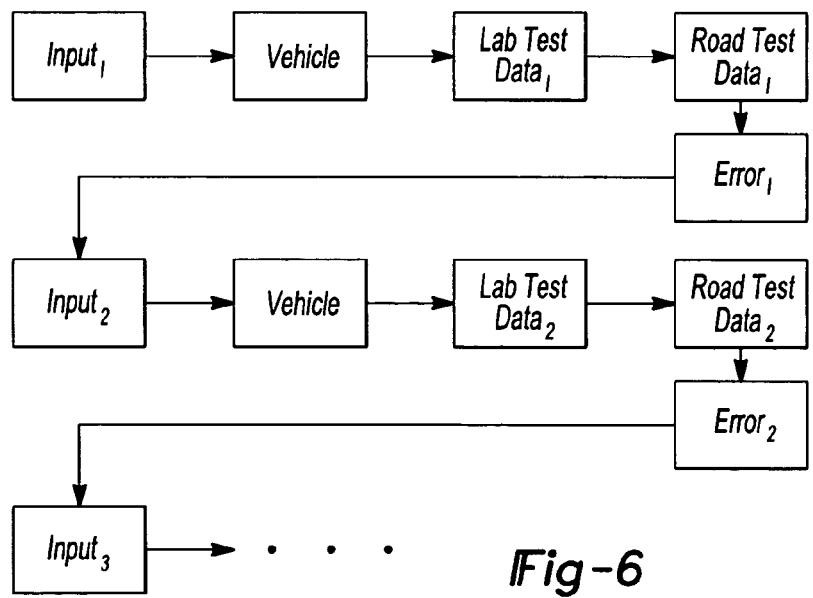
FIG. 6 is a flowchart detailing the iterative testing process of FIG. 5.

The test method of the invention uses acceleration load cells and twist data as control channels to simulate actual road inputs to the frame 14. The collected acceleration and twist data is compared to acceleration and twist data from actual road tests to ensure that the input to the vehicle 12 from the fixture 10 is representative of actual road conditions. FIGS. 5–6 show an exemplary iterative process used to tailor the input to the vehicle 12 such that the vehicle 12 responds in a similar fashion when compared to actual road-test data.

The iterative process, or drive-file development (DFD), shown in FIGS. 5–6 compares actual road data collected during a road test to data collected in a laboratory setting.

For example, a force is applied to the test vehicle 12 on the test fixture 10 (i.e., $input_1$). The response of the vehicle is measured via data collected from accelerometers 46 (i.e., lab test $data_1$). The collected data from accelerometers 46 is compared to actual road test data (i.e., road test $data_1$) and an error (i.e. $error_1$) is generated. The iterative process is continued until the outputted error is within an acceptable predetermined range (i.e., generally within eighty to ninety percent of the total severity of the actual road test). When the error is within the predetermined range, the input to the vehicle 12 is considered to be an acceptable approximation of inputs experienced by the vehicle 12 during actual road tests.

Data from the accelerometers, transducers, and load cells 46, 48, 50, 52 is analyzed using a Power Spectral Density comparison and a severity analysis process. Test roads with the most damage content are usually chosen for DFD and durability testing. In one example, four data input channels are compared, as best shown in Table 1. In this example, only six out of 23 roads are chosen for DFD and durability testing (i.e., Events 3, 12, and 16–19).

Each of the six chosen roads are filtered to maintain only damaging events so that the test may be performed in a laboratory setting within two weeks. Such testing would typically take between three to six months if actual vehicle testing were required. Power Spectral Density plots for each channel are used to determine frequency ranges for DFD. Generally speaking, frequencies between 0.4 to 40 Hz contain ninety percent of the total severity. FIG. 7 shows a complete frequency spectrum for one exemplary transducer.

TABLE 1

Retained severity

| Component box test | | Box Strain #1 Lt Floor | Rr Frame Twist | Rt Box Mount #1 Z | Lt Box Mount #5 Z |
|---|---|---|---|---|---|
| Event | Multiplier | 1 | 4 | 15 | 32 |
| 1 | 1 | 0.02% | 0.00% | 0.04% | 0.04% |
| 2 | 1 | 0.67% | 0.26% | 1.19% | 0.86% |
| 3 | 1 | 4.15% | 4.95% | 2.30% | 3.73% |
| 4 | 1 | 0.06% | 0.00% | 0.09% | 0.15% |
| 5 | 1 | 0.00% | 0.00% | 0.00% | 0.01% |
| 6 | 1 | 0.19% | 0.00% | 0.28% | 0.46% |
| 7 | 1 | 0.71% | 1.31% | 0.64% | 0.58% |
| 8 | 4 | 0.01% | 0.00% | 0.01% | 0.05% |
| 9 | 3 | 0.00% | 0.00% | 0.00% | 0.00% |
| 10 | 1 | 0.00% | 0.00% | 0.00% | 0.01% |
| 11 | 1 | 0.00% | 0.00% | 0.00% | 0.00% |
| 12 | 1 | 31.2% | 27.9% | 43.1% | 29.7% |
| 13 | 1 | 0.00% | 0.00% | 0.00% | 0.00% |
| 14 | 1 | 0.00% | 0.00% | 0.00% | 0.00% |
| 15 | 1 | 0.00% | 0.00% | 0.00% | 0.01% |
| 16 | 1 | 22.4% | 25.7% | 21.4% | 18.2% |
| 17 | 2 | 9.70% | 10.99% | 7.74% | 17.39% |
| 18 | 1 | 21.5% | 22.2% | 17.4% | 17.8% |
| 19 | 1 | 4.77% | 3.43% | 4.52% | 6.73% |
| 20 | 1 | 0.11% | 0.00% | 0.11% | 0.34% |
| 21 | 1 | 0.00% | 0.00% | 0.00% | 0.00% |
| 22 | 1 | 4.51% | 3.25% | 1.11% | 3.98% |
| 23 | 1 | 0.00% | 0.00% | 0.00% | 0.00% |
| Total severity | | 100.0% | 100.0% | 100.0% | 100.0% |
| Retained Severity | | 93.7% | 95.2% | 96.5% | 93.5% |

After editing, each time history is prepared for DFD with each time history being band pass filtered from 0.4 to 40 Hz. During the DFD, the frequency band on several channels can be altered to provide better control of both control and correlation channels. For example, frequency can be controlled within the following frequency ranges at various locations of the vehicle 12: front vertical frame acceleration: 0.4–40 Hz; rear vertical frame acceleration above the rear axle 32: 26–32 Hz; rear vertical frame acceleration at a rear spring hanger: 0.4–26 Hz, 32–40 Hz; lateral frame acceleration: 0.4–40 Hz; longitudinal frame acceleration: 0.4–40 Hz; rear frame twist behind a rear cross-member: 0.4–13 Hz.

Initially, a seven-by-seven channel square frequency response function (FRF) is chosen as the correction matrix for DFD to reproduce seven primary response signals collected during actual road tests. The seven desired response channels include vertical frame acceleration inboard of each engine mount, vertical frame acceleration above the rear axle 32, lateral acceleration on the frame 14 above the lower control arms 34 at right front and right rear corners, and longitudinal acceleration above the lower control arms 34 at a left rear corner. Thirty-three additional channels can be retained as secondary responses for correlation during the course of DFD.

Following tuning of twelve servo-hydraulic loops (i.e., the test fixture 10), MTS RPC Pro Convolution Software can be used to generate shaped white noise for each of the drive channels. Both a single axis x-drive and multi-axis orthogonal drive can be created, for vehicle analysis and modeling. Forty Remote Parameter Control (RPC) response transducers can also be measured.

System input channels may include: left front vertical displacement; right front vertical displacement; left rear vertical displacement; right rear vertical displacement; front lateral translation; rear lateral translation; and overall longitudinal translation.

Vehicle response channels (i.e., control channels) may include: left front vertical frame acceleration inboard of the engine bracket; right front vertical frame acceleration inboard of the engine bracket; left rear vertical frame acceleration above the rear axle 32; right rear vertical frame acceleration above the rear axle 32; right front lateral frame acceleration inboard of the engine bracket; right rear lateral frame acceleration above the rear axle 32; left rear longitudinal frame acceleration above the rear axle 32; left rear vertical frame acceleration behind the rear spring hanger; right rear vertical frame acceleration behind the rear spring hanger; and rear frame twist behind the rear cross-member.

Vehicle response channels (i.e., correlation channels) may include: left no. 1 cross-member box vertical load; left no. 1 cross-member box lateral load; left no. 1 cross-member box longitudinal load; right no. 1 cross-member box vertical load; right no. 1 cross-member box lateral load; right no. 1 cross-member box longitudinal load; left no. 6 cross-member box vertical load; left no. 6 cross-member box lateral load; left no. 6 cross-member box longitudinal load; right no. 6 cross-member box vertical load; right no. 6 cross-member box lateral load; right no. 6 cross-member box longitudinal load; box strain gage no. 1; box strain gage no. 2; box strain gage no. 3; box strain gage no. 4; box strain gage no. 5; box strain gage no. 6; box strain gage no. 7; box strain gage no. 8; bed twist; left front vertical frame acceleration beneath an A-pillar bracket; left front lateral frame acceleration beneath the A-pillar bracket; left front longitudinal frame acceleration beneath the A-pillar bracket; right front longitudinal frame acceleration inboard of the engine bracket; right front vertical frame acceleration beneath the A-pillar bracket; left rear vertical frame acceleration at a front spring hanger; right rear vertical frame acceleration at the front spring hanger; left rear lateral frame acceleration above the rear axle 32; and right rear longitudinal acceleration above the rear axle 32. Box strain gage no. 1, box strain gage no. 2, box strain gage no. 3, box strain gage no. 4, box strain gage no. 5, box strain gage no. 6, box strain gage no. 7, and box strain gage no. 8 are located in high-stress concentration areas identified by computer modeling.

Figure 8:
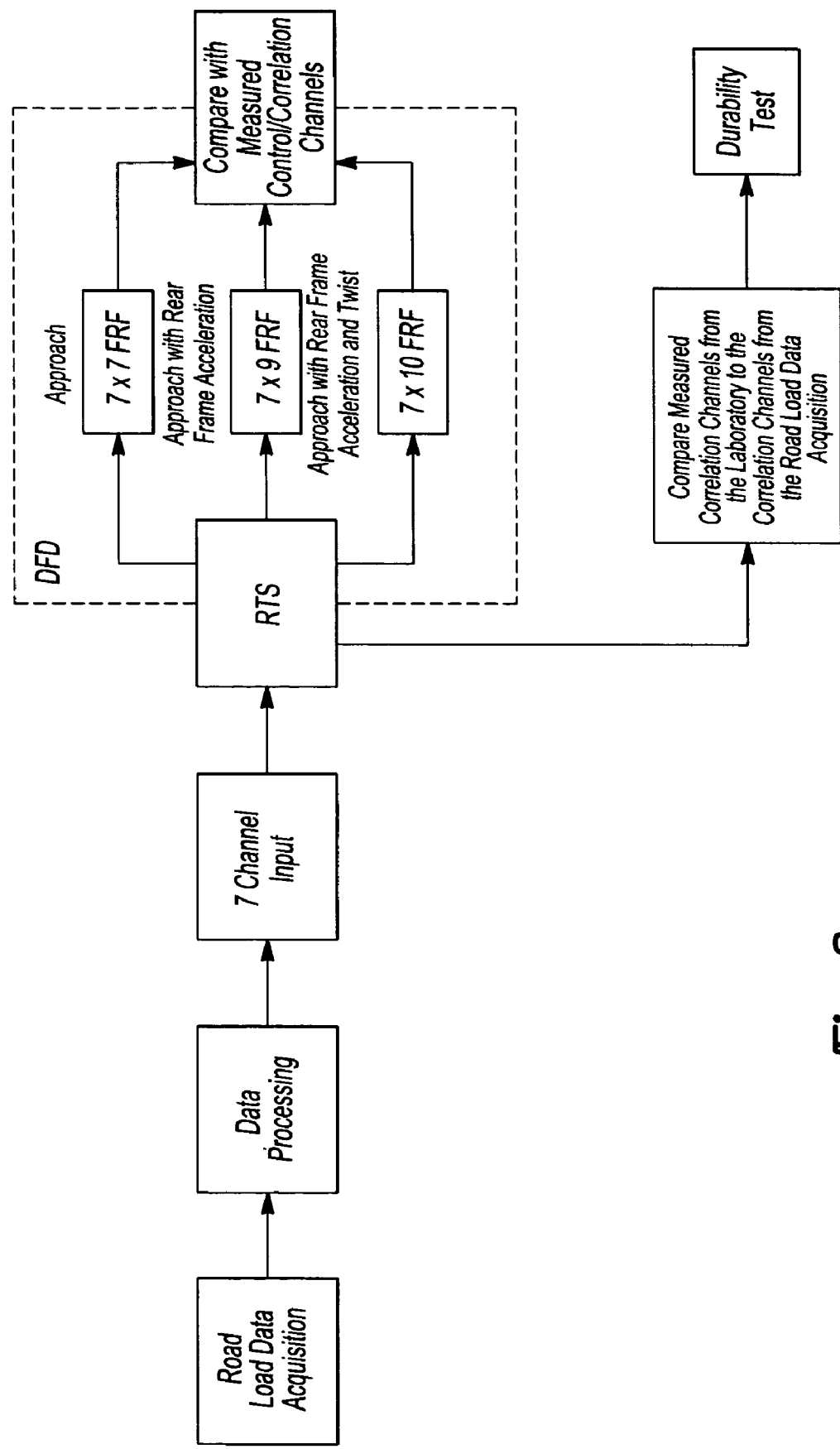
FIG. 8 is a flow chart detailing a drive file development process in accordance with the principles of the invention.

During operation, seven primary channels are extracted from the control channels listed above and several FRF's are calculated between inputs and outputs to establish the best system model (FIG. 8). FRF's are reviewed for symmetry, polarities, phasing, etc., and then normalized, inverted, and prepared for DFD.

Iterations are commenced on a first road employing the seven-by-seven FRF and are continued until data collected from the control channels in the laboratory adequately approximate data collected during an actual road test. Following this result, thirty-three channels of correlation are measured and reviewed to ensure that the data taken in the laboratory closely approximates actual road data.

If the laboratory data does not correlate well with actual road data, additional control channels may be added. For example, a split band iteration approach using a seven-by-nine non-square FRF can be used on the first road in an attempt to provide better correlation for all forty channels. As a result of this approach, a comparison between the loads and strains at the rear of the truck box 18 for a laboratory test and an actual road test are reduced to more acceptable levels. However, some of the box strains and box twist may still read at lower-than-acceptable levels. Under such conditions, a rear frame twist transducer may be added to the current seven-by-nine FRF inverse, as best shown in Table 2.

Figure 10:
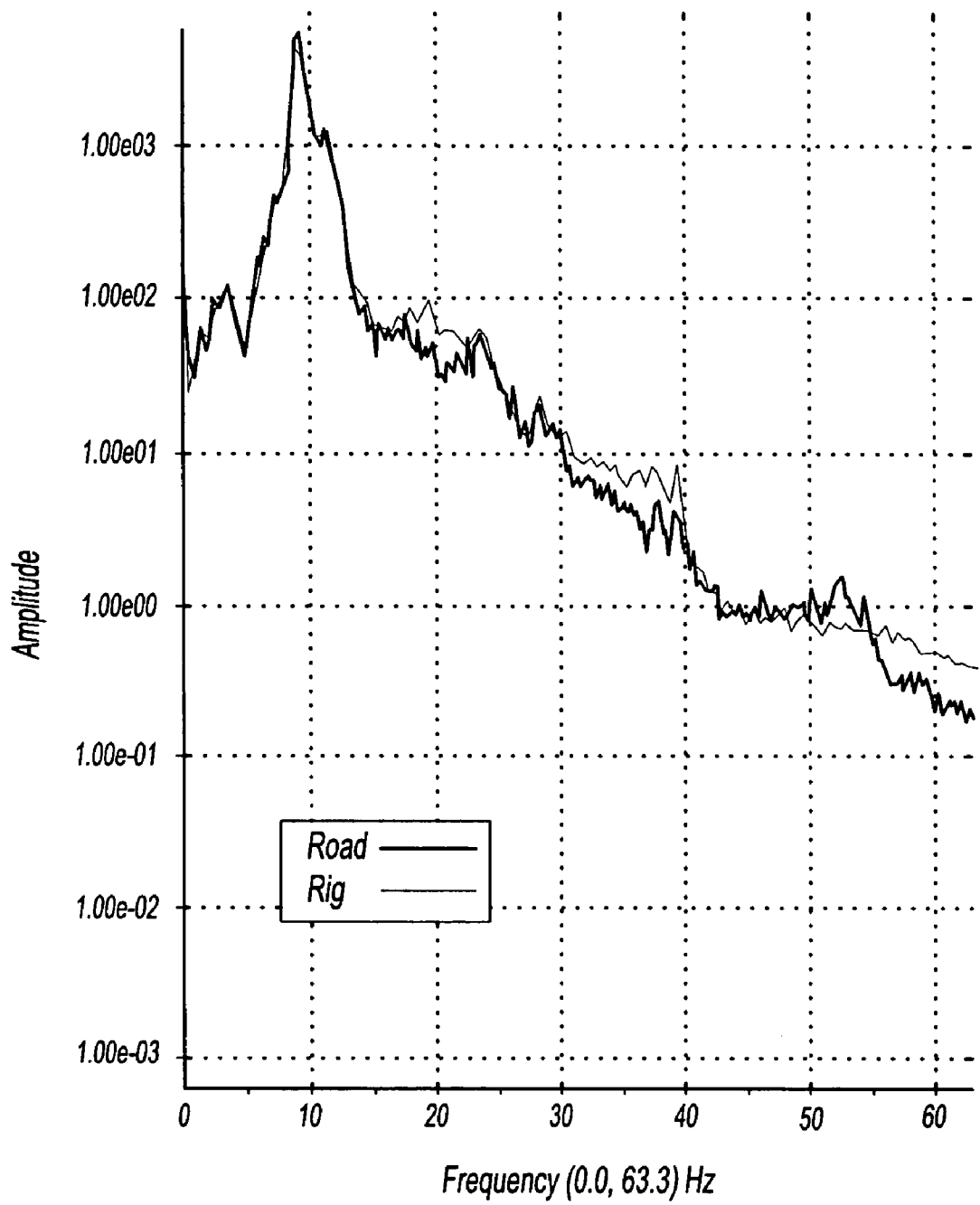
FIG. 10 is an exemplary plot comparing a vertical box load as measured during an actual road test versus a vertical box load as measured using the testing method of the invention.
Figure 11:
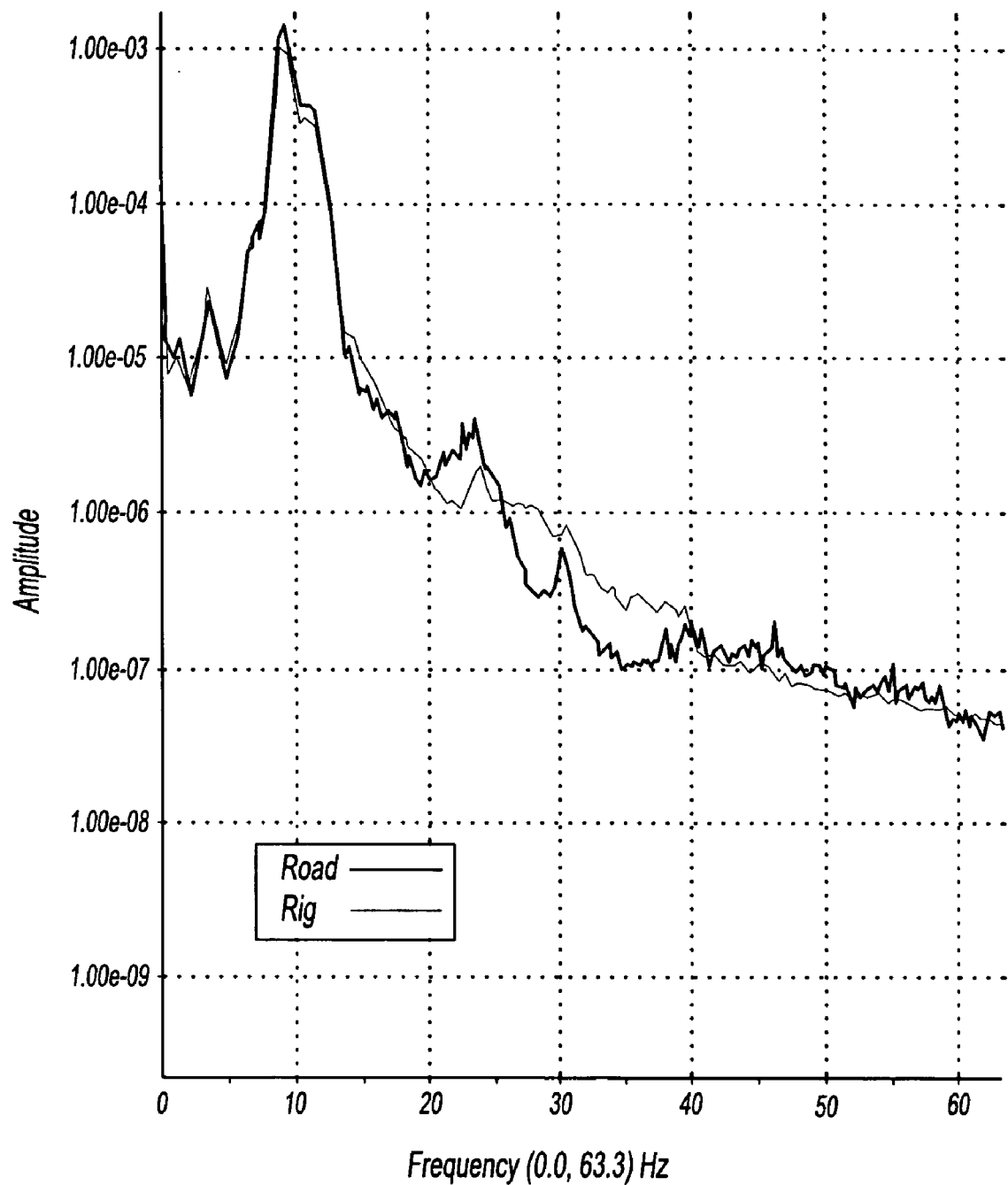
FIG. 11 is an exemplary plot comparing a box twist as measured during an actual road test versus a box twist as measured using the testing method of the invention.

Correlation channels on the truck box 18 are reviewed after each iteration pass. While insertion of the rear frame twist transducer may improve some of the strains, vertical loads, and bed twist on the box 18, some lateral and vertical loads may achieve higher-than-desired levels. Iterations for the first road may be considered complete when the majority of the correlation channels on the truck box 18 achieve an acceptable level. Examples of correlation for box strains, box vertical load, and box twist shown in FIGS. 9–11.

TABLE 2

| Response matrix control channel Response Control Channels | | |
| --- | --- | --- |
| 7 × 7 FRF | 7 × 9 FRF | 7 × 10 FRF |
| Left vertical frame acceleration above front axle | Left vertical frame acceleration above front axle | Left vertical frame acceleration above front axle |
| Right front vertical frame acceleration above front axle | Left longitudinal frame acceleration above rear axle | Right front vertical frame acceleration above front axle |
| Left vertical frame acceleration above rear axle | Left vertical frame acceleration above rear axle | Left vertical frame acceleration above rear axle |
| Right vertical frame acceleration above rear axle | Right vertical frame acceleration above rear axle | Right vertical frame acceleration above rear axle |
| Right lateral frame acceleration above front axle | Right lateral frame acceleration above front axle | Right lateral frame acceleration above front axle |
| Right lateral frame acceleration above rear axle | Right lateral frame acceleration above rear axle | Right lateral frame acceleration above rear axle |

TABLE 2-continued

Response matrix control channel
Response Control Channels

| 7 × 7 FRF | 7 × 9 FRF | 7 × 10 FRF |
|---|---|---|
| Left longitudinal frame acceleration above rear axle | Left longitudinal frame acceleration above rear axle | Left longitudinal frame acceleration above rear axle |
| | Left rear spring shackle frame acceleration | Left rear spring shackle frame acceleration |
| | Right rear spring shackle frame acceleration | Right rear spring shackle frame acceleration |
| | | Rear frame twist |

Iteration statistics and severity comparison are shown in Tables 3, 4, and 5. The criterion to stop iterations for each road surface is when the severity comparison between road and laboratory data ranges between sixty to one hundred and forty percent. An arbitrary curve may be developed that allows all transducers to be evaluated for severity using generic stress fatigue algorithms.

TABLE 3

Iterations statistics
Pot Holes and Cobble Stone Road

| Channel | RMS Desired | RMS Achieved | Percent Error |
|---|---|---|---|
| Rr Frame Twist | 0.04 | 0.04 | −3.3% |
| Box Twist | 0.05 | 0.05 | −3.1% |
| Lt Ft Frame Accel Z Above Axle | 0.20 | 0.22 | 11.8% |
| Rt Ft Frame Accel Y Above Axle | 0.21 | 0.23 | 14.1% |
| Rt Ft Frame Accel Z Above Axle | 0.20 | 0.18 | −13.6% |
| Lt Rr Frm Accel X Above Axle | 0.21 | 0.22 | 7.7% |
| Lt Rr Frm Accel Z Above Axle | 0.29 | 0.35 | 18.9% |
| Rt Rr Frm Accel Y Above Axle | 0.18 | 0.19 | 2.3% |
| Rt Rr Frame Accel Z Above Axle | 0.29 | 0.37 | 25.5% |
| Lt Rr Spring Shackle Accel Z | 0.42 | 0.43 | 4.5% |
| Rt Rr Spring Shackle Accel Z | 0.43 | 0.46 | 6.9% |

| Channel | Maximum Desired | Maximum Achieved | Percent Error |
|---|---|---|---|
| Rr Frame Twist | 0.24 | 0.24 | −1.8% |
| Box Twist | 0.36 | 0.34 | −4.6% |
| Lt Ft Frame Accel Z Above Axle | 2.04 | 1.52 | −25.4% |
| Rt Ft Frame Accel Y Above Axle | 1.68 | 1.88 | 12.3% |
| Rt Ft Frame Accel Z Above Axle | 1.90 | 1.47 | −22.6% |
| Lt Rr Frm Accel X Above Axle | 1.65 | 1.69 | 2.5% |
| Lt Rr Frm Accel Z Above Axle | 1.92 | 2.11 | 10.0% |
| Rt Rr Frm Accel Y Above Axle | 1.32 | 1.58 | 20.1% |
| Rt Rr Frame Accel Z Above Axle | 1.68 | 2.27 | 34.8% |
| Lt Rr Spring Shackle Accel Z | 2.64 | 2.51 | −4.9% |
| Rt Rr Spring Shackle Accel Z | 2.42 | 2.97 | 22.8% |
| Rr Frame Twist | −0.26 | −0.25 | −5.0% |
| Box Twist | −0.36 | −0.38 | 4.1% |
| Lt Ft Frame Accel Z Above Axle | −1.80 | −1.59 | −11.7% |
| Rt Ft Frame Accel Y Above Axle | −1.82 | −1.93 | 6.4% |
| Rt Ft Frame Accel Z Above Axle | −1.80 | −1.41 | −21.2% |
| Lt Rr Frm Accel X Above Axle | −1.56 | −1.49 | −4.7% |
| Lt Rr Frm Accel Z Above Axle | −1.82 | −2.00 | 10.3% |
| Rt Rr Frm Accel Y Above Axle | −1.55 | −1.75 | 12.8% |
| Rt Rr Frame Accel Z Above Axle | −1.76 | −2.15 | 22.4% |
| Lt Rr Spring Shackle Accel Z | −2.34 | −2.19 | −6.7% |
| Rt Rr Spring Shackle Accel Z | −2.40 | −2.43 | 0.9% |

TABLE 4

Iterations severity comparison
Percent Severity Contribution Edited (Road)

| Road Event | Rr Frame Twist | Box Twist | Rt. Box Mount no. 1 Z | Lt. Box Mount no. 5 Z | Box Strain no. 1 |
|---|---|---|---|---|---|
| Gravel Road | 5% | 5% | 4% | 5% | 4% |
| Sine Wave & Washer Board | 30% | 34% | 32% | 20% | 33% |
| Potholes - Passengers Side | 26% | 26% | 20% | 27% | 24% |
| Gravel Road (ungraded) | 10% | 7% | 18% | 18% | 10% |
| Truck Potholes - Drivers side | 23% | 23% | 19% | 23% | 23% |
| Pot Holes & Cobble Stones | 6% | 5% | 7% | 7% | 5% |
| Percent Severity Baseline | 100% | 100% | 100% | 100% | 100% |

TABLE 5

Iterations severity comparison
Percent Severity Contribution Achieved (Lab)

| Road Event | Rr Frame Twist | Box Twist | Rt. Box Mount no. 1 Z | Lt. Box Mount no. 5 Z | Box Strain no. 1 |
|---|---|---|---|---|---|
| Gravel Road | 3% | 3% | 5% | 7% | 6% |
| Sine Wave & Washer Board | 26% | 15% | 33% | 55% | 33% |
| Potholes - Passengers Side | 22% | 17% | 35% | 36% | 45% |
| Gravel Road (ungraded) | 7% | 7% | 7% | 12% | 9% |
| Truck Potholes - Drivers side | 18% | 14% | 25% | 25% | 24% |
| Pot Holes & Cobble Stones | 6% | 5% | 7% | 9% | 6% |
| Percent Severity Achieved | 83% | 61% | 112% | 144% | 122% |

Development methods using frame twist and box loads in conjunction with frame acceleration (i.e., seven-by-ten non-square FRF) generally provide the best results for truck box component testing than development methods where only frame acceleration (i.e., seven-by-seven square FRF) is used. Furthermore, correlation strain levels are reproduced better with a seven-by-ten non-square FRF. Therefore, durability tests show the best correlation between actual on-road tests and simulated laboratory tests using drive files developed with a seven-by-ten non-square FRF.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle component test method comprising:
    measuring first acceleration data at first predetermined locations on a first vehicle frame during an actual road test of a first vehicle;
    measuring second acceleration data at second predetermined locations on a second vehicle frame of a second vehicle mounted on a test fixture, said second predetermined locations corresponding to said first predetermined locations such that said second acceleration data is measured at approximately the same locations on said second vehicle frame as said first acceleration data is measured on said first vehicle frame;
    comparing said second acceleration data to said first acceleration data and outputting an acceleration error; and
    adjusting said test fixture until said acceleration error is within a predetermined range.

2. The vehicle component test method of claim 1, wherein said measuring first acceleration data includes positioning accelerometers on said first vehicle frame at spaced intervals.

3. The vehicle component test method of claim 2, wherein said measuring second acceleration data includes positioning accelerometers on said second vehicle frame at said spaced intervals.

4. The vehicle component test method of claim 1, further comprising measuring a first twist of said first vehicle frame and measuring a second twist of said second vehicle frame.

5. The vehicle component test method of claim 4, further comprising comparing said first twist to said second twist and outputting a twist error.

6. The vehicle component test method of claim 5, further comprising adjusting said test fixture until said twist error is within a predetermined range.

7. The vehicle component test method of claim 1, further comprising measuring a first vertical load applied to said first vehicle frame and measuring a second vertical load applied to said second vehicle frame.

8. The vehicle component test method of claim 7, further comprising comparing said first vertical load to said second vertical load and outputting a load error.

9. The vehicle component test method of claim 8, further comprising adjusting said test fixture until said load error is within a predetermined range.

10. A vehicle component test method comprising:
    measuring first acceleration data at first predetermined locations on a first vehicle frame during an actual road test of a first vehicle;
    measuring first load data between a first truck box and said first vehicle frame;
    measuring second acceleration data at second predetermined locations on a second vehicle frame of a second vehicle mounted on a test fixture, said second predetermined locations corresponding to said first predetermined locations such that said second acceleration data is measured at approximately the same locations on said second vehicle frame as said first acceleration data is measured on said first vehicle frame;
    measuring second load data between a second truck box and said second vehicle frame;
    comparing said second acceleration data to said first acceleration data and outputting an acceleration error;
    comparing said first load data to said second load data and outputting a load error; and
    adjusting said test fixture until said acceleration error is within a predetermined range and said load error is within a predetermined range.

11. The vehicle component test method of claim 10, further comprising measuring a first twist of said first truck box and a second twist of said second truck box.

12. The vehicle component test method of claim 11, further comprising comparing said first twist to said second twist and outputting a twist error.

13. The vehicle component test method of claim 12, further comprising adjusting said test fixture until said twist error is within a predetermined range.

14. The vehicle component test method of claim 10, wherein said measuring first acceleration data includes positioning accelerometers on said first vehicle frame at spaced intervals.

15. The vehicle component test method of claim 14, wherein said measuring second acceleration data includes positioning accelerometers on said second vehicle frame at said spaced intervals.

16. A vehicle component test method comprising:
    measuring first acceleration data at first predetermined locations on a first vehicle frame during an actual road test of a first vehicle;
    providing a second vehicle without suspension components;
    mounting said second vehicle on a test fixture;
    imparting at least one of a force and a displacement on said second vehicle to simulate conditions of said road test;
    measuring second acceleration data at second predetermined locations on a second vehicle frame of said second vehicle, said second predetermined locations corresponding to said first predetermined locations such that said second acceleration data is measured at approximately the same locations on said second vehicle frame as said first acceleration data is measured on said first vehicle frame;
    comparing said second acceleration data to said first acceleration data and outputting an acceleration error; and
    adjusting said at least one of said force and displacement applied to said second vehicle until said acceleration error is within a predetermined range.

17. The vehicle component test method of claim 16, wherein said measuring first acceleration data includes positioning accelerometers on said first vehicle frame at spaced intervals.

18. The vehicle component test method of claim 17, wherein said measuring second acceleration data includes positioning accelerometers on said second vehicle frame at said spaced intervals.

19. The vehicle component test method of claim 16, further comprising measuring a first twist of said first vehicle frame and measuring a second twist of said second vehicle frame.

20. The vehicle component test method of claim 16, further comprising measuring a first vertical load applied to said first vehicle frame and measuring a second vertical load applied to said second vehicle frame.

* * * * *